United States Patent [19]

Nakanishi et al.

[11] Patent Number: 5,402,023

[45] Date of Patent: Mar. 28, 1995

[54] SPINDLE MOTOR AND MAGNETIC FLUID SEAL APPARATUS USED THEREFOR

[75] Inventors: Yoshiaki Nakanishi, Naka; Kenjiro Okamoto, Kumano, both of Japan

[73] Assignee: Nippon Densan Corporation, Japan

[21] Appl. No.: 101,841

[22] Filed: Aug. 4, 1993

[30] Foreign Application Priority Data

Aug. 7, 1992 [JP] Japan .................. 4-232713
Aug. 25, 1992 [JP] Japan .................. 4-248609

[51] Int. Cl.⁶ .......................... H02K 7/14; H02K 7/08
[52] U.S. Cl. ................................. 310/90; 310/67 R
[58] Field of Search ............... 310/88, 67 R, 90; 360/97.02, 98.07, 99.04, 99.08

[56] References Cited

U.S. PATENT DOCUMENTS

| | | | |
|---|---|---|---|
| 4,843,500 | 6/1989 | Elsásser et al. | 360/97.02 |
| 4,953,414 | 9/1990 | Ueno et al. | 310/88 |
| 5,001,581 | 3/1991 | Elsásser | 360/97.02 |
| 5,006,943 | 4/1991 | Elsásser | 360/99.08 |
| 5,009,436 | 4/1991 | Endo et al. | 277/80 |
| 5,047,677 | 9/1991 | Mineta et al. | 310/67 R |

FOREIGN PATENT DOCUMENTS

| | | | |
|---|---|---|---|
| 210560 | 9/1986 | Japan | 360/99.04 |
| 149870 | 6/1988 | Japan | 360/97.02 |
| 4-88859 | 3/1992 | Japan | 310/88 |
| 5-64387 | 9/1993 | Japan | 310/88 |

Primary Examiner—Steven L. Stephan
Assistant Examiner—Clayton E. LaBalle

[57] ABSTRACT

A spindle motor comprising a stationary member, a hub rotatably supported on the stationary member via a pair of bearing members, and a magnetic fluid seal disposed outwardly of at least one of the pair of bearing members. A passageway or conduit hole is provided to conduct between an annular space separated by the stationary member, the magnetic fluid seal means, the rotor and the other of the bearing member and the inside of the motor. Furthermore, a magnetic fluid holder in the magnetic fluid seal is provided.

6 Claims, 3 Drawing Sheets

SPINDLE MOTOR AND MAGNETIC FLUID SEAL APPARATUS USED THEREFOR

FIELD OF THE INVENTION

This invention relates to a spindle motor for rotating and driving a recording disk, and a magnetic fluid seal apparatus used therefor.

DESCRIPTION OF THE PRIOR ART

A spindle motor for rotating and driving a magnetic disk as one example of a recording member is provided with a shaft member (stationary member) fixed to the frame of a disk driving apparatus, a hub rotatably supported on this shaft member via a pair of bearing members, a rotor magnet mounted on the hub, and a stator disposed in opposition to the rotor magnet. The magnetic disc is mounted on the hub rotatably driven in a predetermined direction. Outwardly of the pair of bearing members, a magnetic seal means is disposed. By this magnetic seal means, fine particles of a lubricant used in the bearing members are prevented from escaping outside the motor, namely from entering a disk chamber in which the magnetic disk is accommodated.

However, the spindle motor using the magnetic fluid seal means has the following problems to be solved. The magnetic fluid seal means cooperates with a shaft member, a hub and bearing members and defines a substantially sealed annular space. Accordingly, when changes in atmospheric pressure and in temperature produce a pressure difference beyond a certain limit between this annular space and the inside of the motor, the magnetic fluid in the magnetic fluid seal means becomes unable to endure that pressure difference and is dispersed. Thus, the magnetic fluid seal means is unable to perform its sealing function.

Furthermore, the magnetic fluid seal means used in spindle motors of this type generally has an annular plastic magnet, and the surface of this magnet is coated with a resin coating such as urethane. A pair of pole pieces that can be formed of stainless steel, for example, are disposed on the surface of the magnet, and a magnetic fluid holding means is constructed of the magnet and the pair of pole pieces.

However, the magnet and the pair of pole pieces have conventionally been adhered by a hand operation using an adhesive. Accordingly, a permanent magnet and a pair of pole pieces are liable to get out of each axial center. There is a problem that the gap between the inside surface of a pair of pole pieces and the opposing outside surface becomes non-uniform.

SUMMARY OF THE INVENTION

It is an object of this invention to provide a spindle motor in which when a pressure difference is produced between the inside and outside of an annular space separated by a magnetic fluid seal means, a shaft member, a hub and bearing members, this pressure difference is substantially equalized, and scattering of the magnetic fluid is prevented.

Another object of this invention is to provide a magnetic fluid seal apparatus in which even when a mechanical impact or a heat shock is imparted, the plated layer on the surface of the magnetic fluid holding means is not destroyed, and a safe and exact seal action is obtained.

The other objects and features will be easily understood from the following description.

DESCRIPTION OF THE PREFERRED EMBODIMENTS

Figure 1:
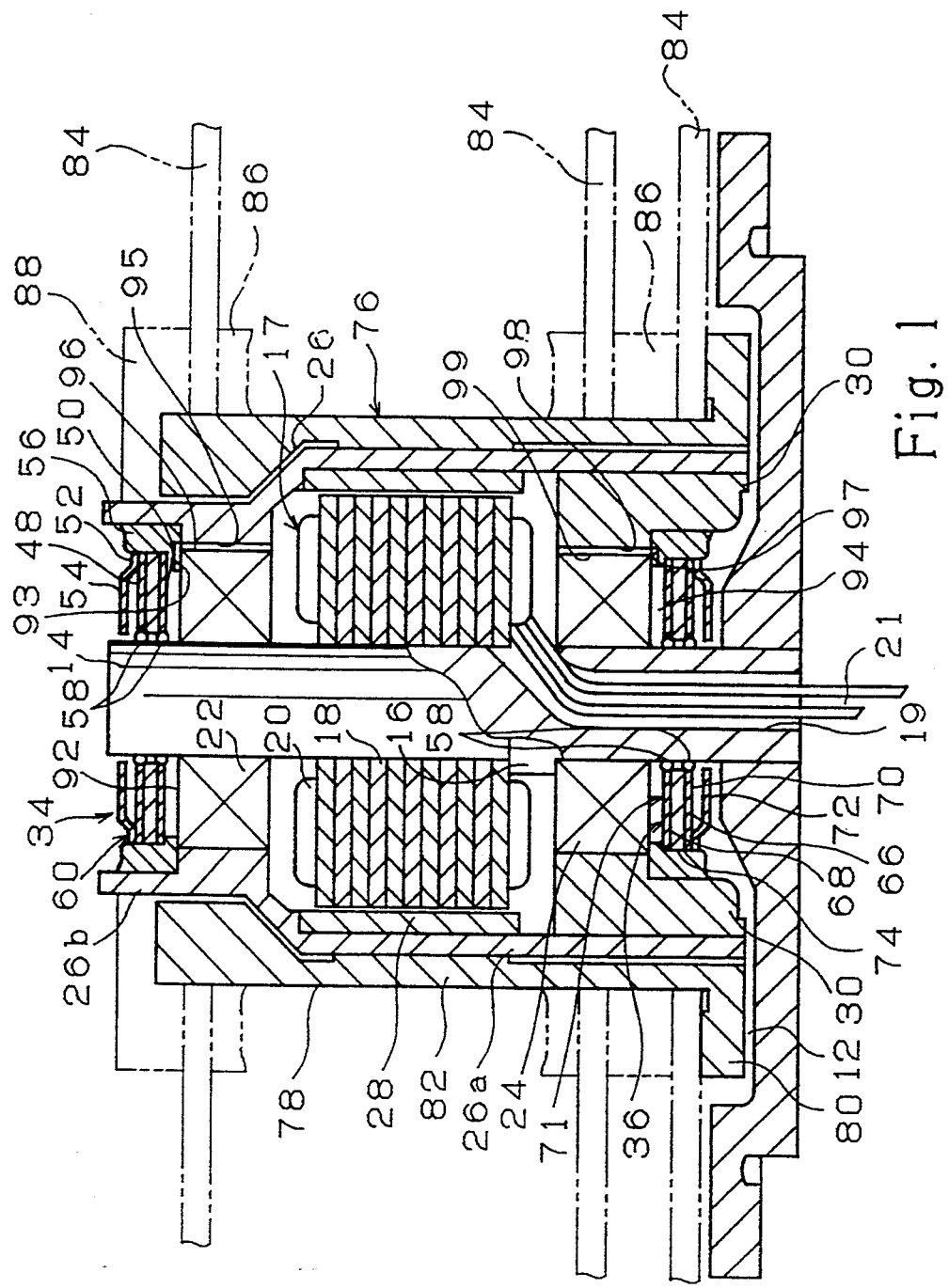
FIG. 1 is a sectional view showing a first embodiment of the spindle motor in accordance with this invention.

The illustrated spindle motor is provided with a nearly circular bracket 10. The upper side of the bracket 10 in FIG. 1 has a centrally raised circular concave portion 12, and its central portion has an upstanding fixed shaft 14 made of a ferromagnetic material.

In the specific example, the bracket 10 and the fixed shaft 14 constitute a stationary member. An annular projected portion 16 is provided on the outside peripheral surface of an intermediate portion of the fixed shaft 14, and a stator 17 is mounted so that it abuts on the annular projected portion 16. The stator 17 has a stator core 18 outwardly inserted and fixed to the fixed shaft 14 on the upper side of the annular projected portion 16, and a stator coil 20 is wound on the stator core 18. A through-hole 19 penetrating from the intermediate portion to the lower end of the fixed shaft 14 is formed, and a lead line 21 from the stator coil 20 is conducted outside of the motor, in the embodiment below the bracket 10, through the through-hole 19.

A hub 78 is rotatably supported via a pair of bearing members 22 and 24. One bearing member 22 is outwardly inserted in the upper end portion of the fixed shaft 14 above the stator coil 20, and the other bearing member 24 is outwardly inserted in the lower end portion of the fixed shaft 14 below the stator coil 20.

A rotor yoke 26 is formed of a ferromagnetic material, and the diameter of its upper end portion is drawn. A cylindrical rotor magnet 28 is fixed to the inner peripheral portion at the upper portion of a large-diameter portion 26a in which the diameter is not drawn. The lower end portion of a large-diameter portion 26a is supported by the bearing member 24 via an annular bush member 30. A small-diameter portion 26b of which diameter is drawn is directly supported on the bearing member 22. The rotor yoke 26 is rotatably supported on the fixed shaft 14. The rotor magnet 28 is opposed to the stator core 18 with a diametrical distance. The hub 78 and the rotor yoke 26 construct a rotor.

Outwardly of the bearing members 22 and 24, magnetic fluid seal means 34 and 36 are disposed. The magnetic fluid seal means 34 has an annular magnetic fluid holding means 38, and the magnetic fluid holding means 38 has pole pieces 48 and 50 composed of annular plates made of ferromagnetic material, and an annular permanent magnet body 52 interposed between the two pole pieces 48 and 50. An annular cover member 54 is disposed outwardly of the magnetic fluid holding means 38. The outer peripheral portion of this cover member 54 is fixed to the upper surface of the upper pole piece 48, and its inner peripheral portion is positioned above the upper surface of the pole piece 48 at a distance. These pole pieces 48 and 50, the annular permanent magnet body 52, and the cover member 54 are fixed to the inside of the annular holder or support member 56.

The holder member 56 is fixed to the upward side of one bearing member 22 in the inner peripheral side of the small-diameter portion 26b of the rotor yoke 26, and a magnetic fluid 58 is filled between the pole piece 48 or 50 and the fixed shaft 14. The magnetic fluid holding means 38 and the magnetic fluid 58 constitute a magnetic fluid seal 60. The cover member 54 is made into a unit with the pole pieces 48 and 50 and the annular permanent magnet body 52.

The other magnetic fluid seal means 36 is substantially of the same structure as the above magnetic fluid seal means 34, and has a magnetic fluid holding means 71 composed of a pair of pole pieces 66 and 68 and an annular permanent magnet 70. A cover member 72 is disposed outwardly of the magnetic fluid holding means 71, and this cover member 72 and the magnetic fluid holding means 71 are mounted on a holder member 74. The holder member 74 is fixed to the underside of the bearing member 24 inwardly of the bush member 30, and the magnetic fluid 58 is provided between each of pole pieces 66 and 68 and the fixed shaft 14.

In the specific example, the fixed shaft 14, the bearing member 22, the yoke 26, the bush member 30, and the other bearing member 24 define the inside of the motor, and a magnetic circuit means composed of the stator 17 and the rotor magnet 28 is disposed in the inside of the motor. In relation to one magnetic fluid seal means 34, a first annular space 92 is defined by the bearing member 22, the fixed shaft 14, the magnetic fluid seal means 34 and the yoke 26, and in relation to other magnetic fluid seal means 36, a second annular space 94 is defined by the other bearing member 24, the fixed shaft 14, the magnetic fluid seal means 36 and the bush member 30.

An aluminum hub 78 is disposed on the outer peripheral surface of the yoke 26. The hub 78 forms a nearly cylindrical type. A lower end portion in FIG. 1 has an outwardly expanded portion 80. The hub 78 has a band-like projecting portion 82 over the entire circumference of the inner peripheral portion at its vertical intermediate position. At this band-like projecting portion 82, the hub 78 is outwardly inserted and fixed to the outer peripheral surface of the rotor yoke 26. Between the hub 78 and the rotor yoke 26, a diametrical gap exists excepting the band-like projecting portion 82.

A magnetic disk 84 as a recording disk is outwardly inserted on the outwardly expanded portion 80 in the outer peripheral portion of the hub 78. The magnetic disk 84 is successively stacked on it via spacers 86, and these magnetic disks 84 are interposed between a clamp member 88 fixed to the upper end portion of the hub 78 and the outwardly expanded portion 80.

In this spindle motor, the first annular space 92 and the inside of the motor are conducted through a passageway or conduit hole 96. In the specific embodiment, a concave groove 93 extending radially is formed in the inner surface (the under surface in FIG. 1) of the holder member 56, and a concave groove 95 extending axially is formed in the inner peripheral surface of the upper end portion of the yoke 26. These concave grooves 93 and 95 constitute the conduit hole 96.

The second annular space 94 and the inner portion of the motor are conducted through a conduit hole 98. In the specific embodiment, a radially extending concave groove 97 is formed in the inner surface (the upper surface in FIG. 1) of a holder member 74. An axially extending concave groove 99 is formed in the inner surface of the bush member 30. Furthermore, these concave grooves 97 and 99 constitute another passageway or conduit hole 98. By providing only one of the conduit hole 96 (the concave grooves 93 and 95) and the conduit hole 98 (the concave grooves 97 and 99), the desired effect can be obtained. If required, a plurality of these conduit holes may be provided at intervals peripherally. Furthermore, the conduit hole 98 is provided in the hub, but it may be formed in the fixed shaft 14 instead of the hub.

The provision of these conduit holes 96 and 98 provides the following functions and effects. When a pressure difference is created between the inside and outside of the first annular space 92 due to the difference in atmospheric temperature or pressure, air flows into the first annular space 92 from the inside of the motor through the conduit hole 96, or the air from the first annular space 92 flows out into the inside of the motor. Furthermore, when a pressure difference occurs between the inside or outside of the second annular space 94, air from the inside of the motor flows into the second annular space 94 through the conduit hole 98, or the air from the second annular space 94 flows out into the inside of the motor. By thus flowing in or flowing out the air, the pressure difference between the inside and outside of the first annular space 92 or between the inside and outside of the second annular space 94 is substantially dissolved, and thus scattering of the magnetic fluid 58 in the magnetic fluid seal means 34 and 36 can be prevented. Furthermore, when a pressure difference takes place between the inside of the motor and its outside, since the inside of the motor is conducted to the outside through a lead line through-hole 19, air flows in or out through the through-hole 19, and therefore the pressure difference between the inside and outside of the motor will be substantially dissolved.

The above specific example has been described with reference to spindle motors in which a magnetic fluid seal means is disposed outwardly of a pair of bearing members, but the invention is not limited to this specific example. This description may be applied equally to a spindle motor in which a magnetic fluid seal means is disposed outwardly of one of the pair of bearing members and a labyrinth seal means is disposed outwardly of the other bearing member.

Figure 2:
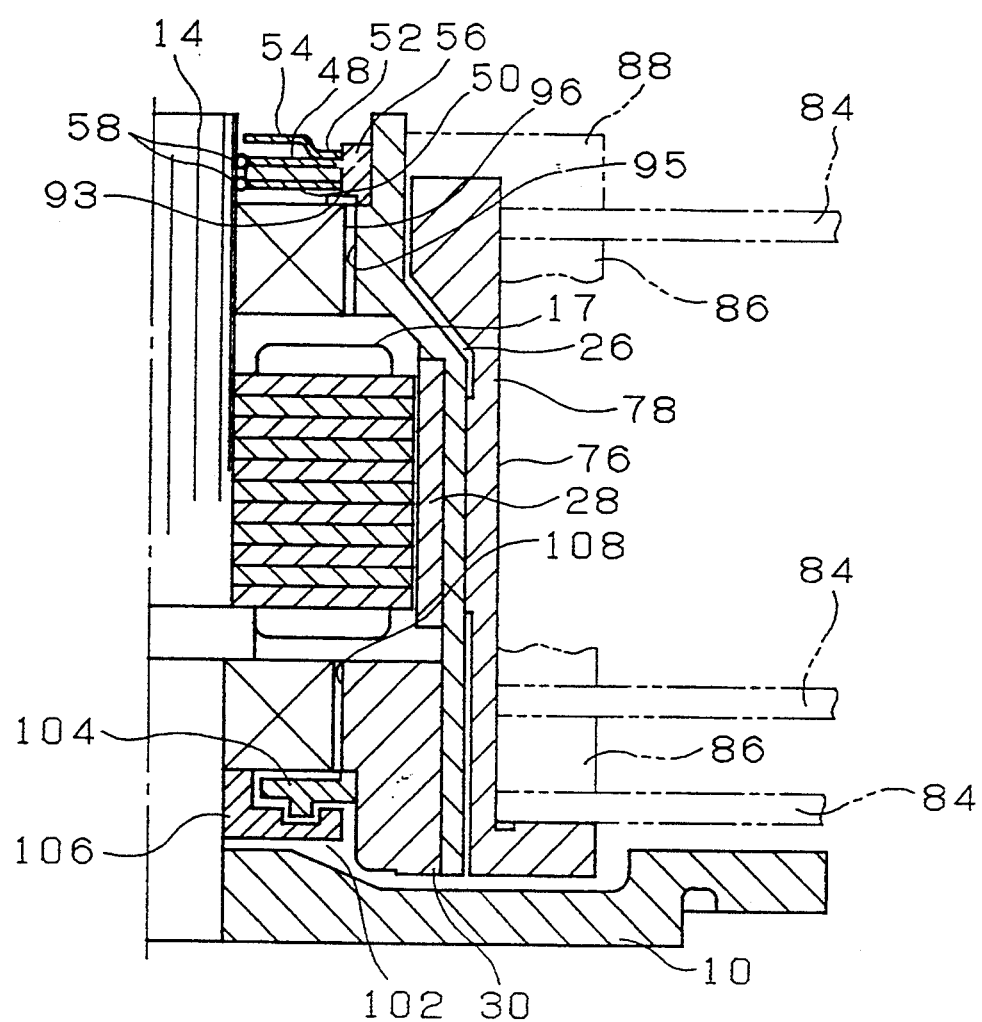
FIG. 2 is a sectional view showing a part of a second embodiment of the spindle motor in accordance with this invention.

In FIG. 2, the same members as in FIG. 1 will be described by attaching the same reference numerals.

A magnetic fluid seal member 34 is disposed outwardly of one bearing member 22. In relation to this magnetic fluid seal means 34, the conduit hole 96 conducting the first annular space 92 and the inside of the motor is provided. Furthermore, a labyrinth seal means 102 is provided outwardly of the other bearing member 24. The labyrinth seal member 102 is constructed of an inside member 104 mounted on the bush member 30 and an outside member 106 mounted on the fixed shaft 14, and these inside member 104 and outside member 106 constitute a labyrinth seal. As in the example shown in FIG. 1, when the inside and outside of the motor are conducted through a through-hole 19, a conduit hole should not be provided in relation to the labyrinth seal means 102. But when this through-hole 19 is sealed up with an adhesive or the like, it is desirable to form a conduit hole as shown in FIG. 2.

As shown in FIG. 2, a conduit hole 108 is formed at one end portion (the position on which the bearing member 24 is mounted) of the bush member 30. As required, this conduit hole 108 may be provided in a plurality of numbers at intervals in the peripheral direction.

By thus forming a conduit hole 108, the inside of the motor becomes a conducting state with respect to a disk chamber (a chamber in which a magnetic disk is accommodated), and no pressure difference substantially occurs between the inside of the motor and the outside of the motor (disk chamber). Accordingly, in the same way as described above, even when the through-hole 19 is sealed, scattering of the magnetic fluid 58 is prevented in the magnetic fluid seal means 34.

Figure 3:
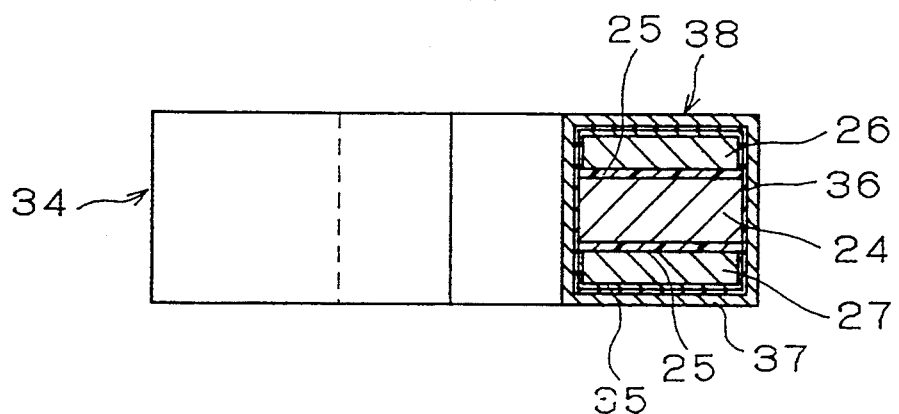
FIG. 3 is a partial sectional view of principal portions of a first embodiment of the magnetic fluid seal apparatus in accordance with this invention; and, FIG. 4 is a sectional view of a part of the magnetic fluid seal apparatus of FIG. 3 on an enlarged scale.
Figure 4:
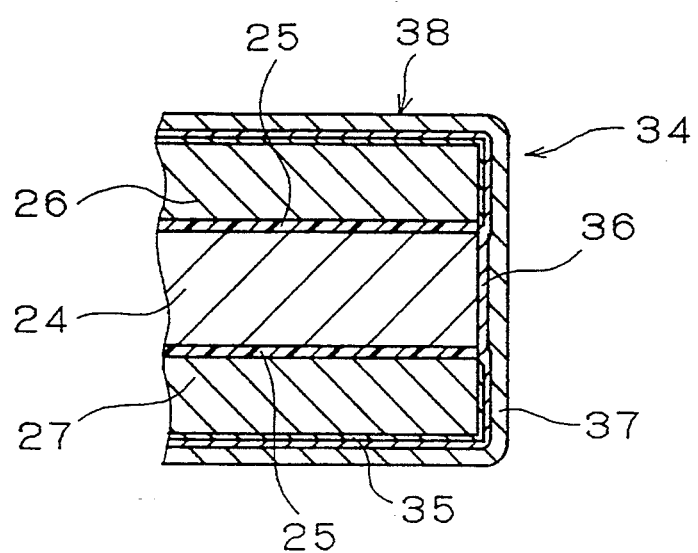

Now, with reference to FIGS. 3 and 4, a magnetic fluid seal apparatus that can be conveniently used in the spindle motor will be illustrated.

In FIG. 3, a magnetic fluid holding means 234 of the illustrated magnetic fluid seal apparatus has an annular permanent magnet 224. On the surface of the permanent magnet 224, a resin coating film 225 such as urethane is formed, and flat plate-like pole pieces 226 and 227 composed of stainless steel are disposed on the upper and under surfaces of the permanent magnet 224. This magnetic fluid holding means 234 is formed by punching a laminate composed of the permanent magnet 224 and a pair of pole pieces 226 and 227.

On the surface of a magnetic fluid holding means 234, copper is electroplated as a groundwork treatment to form a groundwork plated layer 235 electroplated with a metal having a considerably smaller ionization inclination than stainless steel. Herein, on the surfaces of the pole pieces 226 and 227, namely on the surface of stainless steel, a passive state layer, namely a chromium oxide film, is formed and becomes chemically stable conditon. However, by electroplating copper having a considerably smaller ionization inclination, due to the relatively large difference in ionization inclination between the constituting elements of stainless steel and copper, and absorbed metal atom of the metal ion of copper on the surface of stainless steel is successively formed and precipitated. This groundwork plated layer 235 does not adhere to the inner peripheral surface and the outer peripheral surface, namely the surface of the permanent magnet 224 composed of a plastic magnet.

A non-electrode plating such as a non-electrode nickel plating is applied to the magnetic fluid holding means 234 to form a non-electrode plated layer 236 (such as a non-electrode nickel plated layer) on the surface of the groundwork plated layer 235. In this case, a passive state layer such as the surface of a conventional stainless steel is not formed on the surface of copper as a groundwork plated layer 235. Accordingly, by a chemical reaction, a non-electrode plated layer 236 is precipitated with good sealability on the surface of the groundwork plated layer 235. Thereafter, electroplating such as electroplating of nickel is applied to form an electroplated layer (such as a nickel electroplated layer 237) on the surface of the non-electrode plated layer 236.

In such a magnetic fluid seal apparatus in which the surface of the magnetic fluid holding means 234 is covered with a plated protected layer 238, the groundwork plated layer 235 applied by the groundwork treatment has good sealability with the pole pieces 226 and 227 composed of stainless steel. Therefore, the sealability of the non-electrode plated layer 236 to be thereafter formed becomes good, and there is no fear that the plated protective layer 238 will be cracked or peeled.

In the specific embodiment, a urethane resin coating film is formed on the surface of a permanent magnet composed of a plastic magnet, and pole pieces formed from stainless steel are secured to both end surfaces of a so-coated permanent magnet to form a magnetic fluid holding means. A copper metal plated layer is formed on the magnetic fluid holding means to form a copper underground plated layer on the surface of the pole pieces. Thereafter, a non-electrode plated layer is applied to form a non-electrode nickel plated layer on the surface of the copper underground plated layer, and thereafter, nickel is electroplated to form a nickel electroplated layer on the surface of the non-electrode nickel plated layer. In the aforesaid manner, 50 magnetic fluid holding means were formed and plated protective layers were examined. In all the magnetic fluid holding means, sufficiently firm plated protective layers were obtained.

The magnetic fluid holding means 234 mentioned above may be used instead of magnetic fluid holding means in the spindle motor of FIG. 1.

In the above-mentioned specific embodiment, a magnetic fluid is filled between the inner peripheral surface of the magnetic fluid holding means 234 and a shaft member (not shown) opposite to it. But the invention is not limited to this embodiment, and a magnetic fluid may be filled between the outer peripheral surface of the magnetic fluid holding means 234 and a member (such as a hub) positioned in opposition to it.

What we claim is:

1. A spindle motor comprising a stationary member, a rotor rotatably supported on the stationary member via a pair of bearing members, and a magnetic fluid seal means disposed outwardly of at least one of the pair of bearing members, wherein a conduit hole is provided between an annular space bounded by the stationary member, the magnetic fluid seal means, the rotor and one of the bearing members and the inside of the motor, and the annular space and the inside of the motor are connected via the conduit hole.

2. The spindle motor of claim 1 wherein the magnetic fluid seal means is provided with a holder member mounted on the rotor and a magnetic fluid holding means mounted on the holder member, the conduit hole is formed in the holder member and the rotor, and the annular space and the inside of the motor are conducted via the conduit hole.

3. The spindle motor of claim 2 wherein the rotor is composed of a hub mounted within a disk and a yoke mounted on an inner surface of the hub, and the holder member mounted on the yoke, and the conduit hole is formed in the yoke and the holder member.

4. The spindle motor of claim 1 wherein one of pair of bearing members supports rotatably the rotor through a bush member, and the magnetic fluid seal means comprise the holder member mounted on the bush member and the magnetic fluid holding means mounted on the holder member, and the conduit hole is formed in the holder member and the bush member, and the annular space and the inside of the motor are conducted through the conduit hole.

5. The spindle motor of claim 1 wherein the par of bearing members are disposed at both end portions of the stationary member, the stator is disposed between the pair of bearing member, the magnetic fluid seal means is provided each outwardly of the pair of bearing members, a first conduit hole is provided to conduct between the annular space stipulated by one end portion of the stationary member, the magnetic fluid seal means, the hub and one bearing member and the inside of the motor, a second conduit hole is provided to conduct between the annular space stipulated by the other end portion of the stationary member, the magnetic fluid seal means, the hub and the other bearing member and the inside of the motor, and the inside of the motor is conducted through a through-hole for conducting the coil of the stator to the outside, of the motor.

6. The spindle motor of claim 1 wherein the pair of bearing members are disposed at both end portions of the stationary member, the magnetic fluid seal means is disposed outwardly of one bearing member, a labyrinth seal means is provided outwardly of the other bearing member, and the conduit hole is provided to conduct between the annular space stipulated by the stationary member, the magnetic fluid seal means, the hub and the one bearing member and the inside of the motor.

* * * * *